US012083503B2

(12) United States Patent
Nguyen et al.

(10) Patent No.: US 12,083,503 B2
(45) Date of Patent: Sep. 10, 2024

(54) SUPPORTED OXIDE NH₃-SCR CATALYSTS WITH DUAL SITE SURFACE SPECIES AND SYNTHESIS PROCESSES

(71) Applicants: TOYOTA MOTOR EUROPE, Brussels (BE); CENTRE NATIONAL DE LA RECHERCHE SCIENTIFIQUE, Paris (FR); UNIVERSITE CLAUDE BERNARD LYON 1, Villeurbanne (FR); ECOLE SUPERIEURE DE CHIMIE PHYSIQUE ELECTRONIQUE DE LYON, Villeurbanne (FR)

(72) Inventors: Phuc Hai Nguyen, Brussels (BE); Marc-Olivier Charlin, Sainte-Sigolene (FR); Cherif Larabi, Villeurbanne (FR); Kai Chung Szeto, Villeurbanne (FR); Mostafa Taoufik, Villeurbanne (FR)

(73) Assignees: TOYOTA MOTOR EUROPE, Brussels (BE); CENTRE NATIONAL DE LA RECHERCHE SCIENTIFIQUE, Paris (FR); UNIVERSITE CLAUDE BERNARD LYON 1, Villeurbanne (FR); ECOLE SUPERIEURE DE CHIMIE PHYSIQUE ELECTRONIQUE DE LYON, Villeurbanne (FR)

( * ) Notice: Subject to any disclaimer, the term of this patent is extended or adjusted under 35 U.S.C. 154(b) by 95 days.

(21) Appl. No.: 17/616,824

(22) PCT Filed: Jun. 4, 2019

(86) PCT No.: PCT/IB2019/000711
§ 371 (c)(1),
(2) Date: Dec. 6, 2021

(87) PCT Pub. No.: WO2020/245621
PCT Pub. Date: Dec. 10, 2020

(65) Prior Publication Data
US 2022/0305464 A1 Sep. 29, 2022

(51) Int. Cl.
*B01J 23/10* (2006.01)
*B01D 53/94* (2006.01)
(Continued)

(52) U.S. Cl.
CPC .......... *B01J 23/30* (2013.01); *B01D 53/9418* (2013.01); *B01J 23/10* (2013.01); *B01J 37/0217* (2013.01);
(Continued)

(58) Field of Classification Search
None
See application file for complete search history.

(56) References Cited

U.S. PATENT DOCUMENTS

| 4,647,704 A * | 3/1987 | Engel ...................... C07C 37/52 568/761 |
| 9,283,548 B2 | 3/2016 | Notestein et al. |
| 2017/0128913 A1 | 5/2017 | Goffe |

FOREIGN PATENT DOCUMENTS

| EP | 0603409 | * | 6/1994 |
| EP | 2022772 A1 | | 2/2009 |

(Continued)

OTHER PUBLICATIONS

Phillips and Ternan, Proceedings 9th Internation Congress on Catalysis. Arata, et al. "Synthesis of Solid Superacid of Tungsten Oxide Supported on Zirconia and Its Catalytic Action". vol. 4. Oxide Catalysts and Catalyst Development. 1988. (Year: 1998).*
(Continued)

*Primary Examiner* — Sheng H Davis
(74) *Attorney, Agent, or Firm* — Oliff PLC

(57) ABSTRACT

A process for preparing a catalyst material, includes the steps of: (a) providing a support material having surface hydroxyl (OH) groups, wherein the support material is ceria
(Continued)

($CeO_2$), zirconia ($ZrO_2$) or a combination of thereof; (b) reacting the support material having surface hydroxyl (OH) groups of step (a) with a precursor containing two transition metal atoms, each chosen independently from the group consisting of: W, Mo, Cr, Ta, Nb, V, Mn; (c) calcining the product obtained in step (b) in order to provide a catalyst material showing dual site surface species containing pairs of transition metal atoms derived from the precursor that are present in oxide form on the support material. Additionally, a catalyst material is obtained by the process set out above, and the catalyst material is used as an ammonia selective catalytic reduction ($NH_3$-SCR) catalyst for nitrogen oxides (NOx) reduction.

7 Claims, 13 Drawing Sheets

(51) Int. Cl.
　　　B01J 23/30　　　(2006.01)
　　　B01J 37/02　　　(2006.01)
　　　B01J 37/08　　　(2006.01)
　　　C07F 11/00　　　(2006.01)

(52) U.S. Cl.
　　　CPC ....... B01J 37/0219 (2013.01); B01J 37/0228 (2013.01); B01J 37/086 (2013.01); C07F 11/005 (2013.01); B01D 2255/20776 (2013.01)

(56) References Cited

FOREIGN PATENT DOCUMENTS

| EP | 2985077 A1 | | 2/2016 |
|---|---|---|---|
| GB | 2493449 | * | 6/2013 |
| JP | 2003-210987 A | | 7/2003 |
| JP | 2009-512689 A | | 3/2009 |
| WO | 9503121 | * | 7/1994 |
| WO | 9925473 | * | 5/1999 |
| WO | 2017046680 A1 | | 3/2017 |
| WO | 2019/030681 A1 | | 2/2019 |

OTHER PUBLICATIONS

ChemBlink. Ammonium Metatungstate Hydrate. 2023 (Year: 2023).*
Jun. 2, 2023 Office Action issued in U.S. Appl. No. 17/616,942.
Hanjing Tian et al., "Quantitative Determination of Speciation of Surface Vanadium Oxides and Their Catalytic Activity", J. Phys. Chem B 2006, Apr. 21, 2006, pp. 9593-9600.
Loyd J. Burcham et al., "In Situ Vibrational Spectroscopy Studies of Supported Niobium Oxide Catalysts", J. Phys. Chem. B 1999, Jun. 30, 1999, pp. 6015-6024.
Zili Wu et al., "Structure of Vanadium Oxide Supported on Ceria by Multiwavelength Raman Spectroscopy", The Journal of Physical Chemistry, Nov. 19, 2011, pp. 25368-25378.
L. Chmielarz et al., "Catalytic performance of various mesoporous silicas modified with copper or iron oxides Introduced by different ways in the selectice reduction of NO by ammonia", Applied Catalysis B: Environmental 62 (2006), pp. 369-380.
P. Avenier et al., "Dinitrogen Dissociation on an Isolated Surface Tantalum Atom", Science, vol. 317, Aug. 24, 2007, pp. 1056-1060.
Seok-Kyun Noh et al., "Oxo-Alkyls of Crv and CrVI", J. Am. Chem. Soc. 1992, vol. 114, pp. 1892-1893.
Salih S. Al-Juaid et al., "Attachment to manganese or cobalt of a bulky tri(organosilyl)methyl ligand containing an NMe2 or an OMe donor group", Journal of Organometallic Chemistry,2002, vol. 649, pp. 121-127.
Fu-Ming Wang, "Synthesis and Crystal Structure Determination of Di-?-Oxo Bis[oxovanadium(V)] Complexes Derived From 2-Ethoxy-6-[(2-methylaminoethylimino)methyl]phenol and 2-Methoxy-6-[(2-phenylaminoethylimino)methyl] phenol", Synthesis and Reactivity in Inorganic, Metal-Organic, and Nano-Metal Chemistry, vol. 43, May 2, 2013, pp. 1001-1006.
D. N. Clark et al., "Multiple Metal-Carbon Bonds. 12.1 Tungsten and Molybdenum Neopentylidyne and Some Tungsten Neopentylidene Complexes", Journal of the American Chemical Society, vol. 100, Oct. 11, 1978, pp. 6774-6776.
Richad R. Schrock et al., "2,2-Dimethylpropylidyne Tungsten(VI) Complexes and Precursors for their syntheses", Inorganic Syntheses, 1989, vol. 26, pp. 44-51.
R.R. Schrock et al., "Tungsten(VI) Neopentylidyne Complexes", Organometallics, May 27, 1982, pp. 1645-1651.
M. H. Chisholm et al., "New Metalloorganic Compounds of Tungsten", Journal of the American Chemical Society, Sep. 17, 1975, vol. 97, pp. 5625-5627.
Malcom H. Chisholm et al., "Crystal and molecular structure of W2(OBut)6 and electronic structure calculations on various conformers of W2(OMe)6", Polyhedron, 2006, vol. 25, pp. 827-833.
Ednéia Caliman et al., "Preparation and characterization of H3PW12O40 supported on niobia", Microporous and Mesoporous Materials, Feb. 6, 2010, pp. 103-111.
Xingtao Gao et al., "Investigation of Surface Structures of Supported Vanadium Oxide Catalysts by UV-vis-NIR Diffuse Reflectance Spectroscopy", J. Phys. Chem B. Dec. 13, 1999, vol. 104, pp. 1261-1268.
Elizabeth I. Ross-Medgaarden et al., "Structural Determination of Bulk and Surface Tungsten Oxides with UV-vis Diffuse Reflectance Spectroscopy and Raman Spectroscopy", J. Phys. Chem. C, Jul. 27, 2007, vol. 111, pp. 15089-15099.
U.S. Appl. No. 17/616,942, filed Dec. 6, 2021 in the name of Phuc Hai Nguyen et al.
Jul. 1, 14, 2023 Office Action issued in Chinese Patent Application No. 201980097141.0.
Jan. 10, 2023 Office Action issued in Japanese Patent Application No. 2021-572083.
Jan. 10, 2023 Office Action issued in Japanese Patent Application No. 2021-572091.

* cited by examiner

SUPPORTED OXIDE NH$_3$-SCR CATALYSTS WITH DUAL SITE SURFACE SPECIES AND SYNTHESIS PROCESSES

FIELD OF THE INVENTION

The present invention relates to the synthesis of ammonia selective catalytic reduction (NH$_3$-SCR) catalysts for nitrogen oxides (NOx) reduction.

BACKGROUND ART

Toxic NOx gases (NO, NO$_2$, N$_2$O) included in exhaust gases from fossil-fuel-powered vehicles or stationary sources such as power plants are required to be converted to N$_2$ before being released to the environment. This is normally done by using different types of NOx reduction catalysts such as three-way catalysts (TWC), NOx storage reduction (NSR), or selective catalytic reduction (SCR) using ammonia as external reducing agent (NH$_3$-SCR).

Metal oxides such as V$_2$O$_5$ are known to be good NH$_3$-SCR catalysts. It has been suggested that the catalytic activity is achieved by the complementary features of acidity and reducibility of the surface species. Briefly, NH$_3$ is adsorbed on a Brønsted acid site (V$^{5+}$—OH) followed by N—H activation through the adjacent V=O surface groups through a redox cycle (V$^{5+}$=O/V$^{4+}$—OH). The resulting surface complex reacts with gaseous or weakly adsorbed NO through Langmuir-Hinshelwood and Eley-Rideal mechanisms, respectively, to form NH$_2$NO intermediate species which undergo decomposition into N$_2$ and H$_2$O. An alternate mechanism (amide-nitrosamide) involving the adsorption of NH$_3$ over Lewis acid sites has also been proposed. Furthermore, under realistic conditions, particularly when a peroxidation catalytic convertor is placed upstream of the SCR catalytic convertor, this gives rise to formation of nitrogen dioxide which favors the SCR reaction known as fast-SCR. Indeed NO$_2$ allows fast re-oxidation of the reduced species. However, the optimal NO$_2$/NO ratio is one, and the presence of excess NO$_2$ is also reduced through slower reaction leading to a lower total SCR reaction rate. Metal oxide catalysts such as V$_2$O$_5$ are developed mostly by synthesis routes such as impregnation, which normally produce nanoparticles of metal dispersed on support. The problem of such catalysts is the low performance, such as low NOx conversion and/or low N$_2$ selectivity.

Prior art catalysts have often used Cu, Fe, which are well recognized as good active sites for NH$_3$-SCR when incorporated into zeolite materials. As regards support materials, prior art has often used SiO$_2$, which has high specific surface area, and may be expected to improve SCR performance by increasing the quantity of active sites.

U.S. Pat. No. 9,283,548 B2 discloses catalysts of the type: MA/CeO$_2$ (M=Fe, Cu; A=K, Na), the synthesis route being impregnation, with chelating agents such as EDTA, DTPA being used.

J. Phys. Chem. B 2006, 110, 9593-9600 [Tian 2006] discloses catalysts of the type: VOx/AO$_2$ (A=Ce, Si, Z), the synthesis route being impregnation. Applications include propane oxidative dehydrogenation (ODH). Dispersion and physisorption of the vanadium oxo-isopropoxide is achieved, rather than chemisorption.

J. Phys. Chem. B 1999, 103, 6015-6024 [Burcham 1999] discloses catalysts of the type: Nb$_2$O$_5$/SiO$_2$, Al$_2$O$_3$, ZrO$_2$, TiO$_2$, the synthesis route being impregnation. The reference discusses surface species of isolated Nb, characterized by vibrational spectroscopy. The preparation is carried out in water, and the metal is deposited on the surface, rather than being grafted by protonolysis.

J. Phys. Chem. C 2011, 115, 25368-25378 [Wu 2011] discloses catalysts of the type: VOx/CeO$_2$, SiO$_2$, ZrO$_2$, the synthesis route being impregnation. Iso-propanol is used as a solvent, not leading to grafting of the precursor on the surface, but instead only dispersion and physisorption of the vanadium oxo-isopropoxide.

Appl. Catal. B 62, 2006, 369 [Chmielarz 2006] describes catalysts of the type: Fe or Cu/SiO$_2$ (3 different forms). It is widely known that Cu and Fe show good NH$_3$-SCR performance when zeolites are used (ion-exchange synthesis). The catalyst materials were used for deNOx by NH$_3$-SCR. Synthesis was carried out by molecular designed dispersion (MDD) using precursors Fe(acac)$_3$, Cu(acac) (acac=acetylacetonate).

Science 2007, 317, 1056-1060 [Avenier 2007] describes cleavage of dinitrogen on isolated silica surface-supported tantalum(III) and tantalum(V) hydride centers [(≡Si—O)$_2$Ta$^{III}$-H] and [(≡Si—O)$_2$Ta$^V$-H$_3$].

EP 2 985 077 A1 describes SiO$_2$-supported molybdenum or tungsten complexes, such as trialkyltungsten or molybdenum oxo complexes, their preparation and use in olefin metathesis.

SUMMARY OF THE INVENTION

In order to address the problems associated with prior art products and processes in the field of ammonia selective catalytic reduction (NH$_3$-SCR) catalysts for nitrogen oxides (NOx) reduction, the processes and products of the present invention have been developed.

The Surface Organometallic Chemistry (SOMC) approach is capable of modifying the surface of support materials by grafting organometallic precursors, i.e. forming chemical bonds between precursors and surface hydroxyl groups, and thus preserving the local structure of the grafted material to minimize the formation of diversified species on the surface of support materials that are normally created through conventional synthesis methods. This methodology can be used to synthesize metal oxide catalysts supported with different metals. A typical SOMC procedure to synthesize materials consists of 3 steps as follows:

Step 1: Preparation, example:
   a Support materials:
      calcination
      hydratation
      dehydroxylation to generate controlled concentrations of hydroxyl groups
   Metal precursors:
      Synthesis (for those that are not readily available)

Step 2: Grafting
   Allow metal precursors to react with surface hydroxyl groups of the support material in a solution, for example toluene, typically at room temperature (~25° C.)
   Washing and drying Step 3: Activation
   Remove remaining organic ligands, typically by calcination at around 500° C. or higher in 16 h under air flow The present invention discloses the development of new oxide NH$_3$-SCR catalysts with improved NOx reduction performance by using new SOMC procedures.

Thus, in a first aspect, the present invention relates to a process for preparing a catalyst material, comprising the steps of:

(a) providing a support material having surface hydroxyl (OH) groups, wherein the support material is ceria ($CeO_2$), zirconia ($ZrO_2$) or a combination of thereof;
(b) reacting the support material having surface hydroxyl (OH) groups of step (a) with a precursor containing two transition metal atoms, each chosen independently from the group consisting of: W, Mo, Cr, Ta, Nb, V, Mn;
(c) calcining the product obtained in step (b) in order to provide a catalyst material showing dual site surface species containing pairs of transition metal atoms derived from the precursor that are present in oxide form on the support material.

In preferred embodiments of the process of the invention, the precursor has the two transition metal atoms directly bonded to one another or linked through one or more oxygen atoms.

In preferred embodiments of the process of the invention, transition metal atoms of the precursor are identical. The precursor may be have a dimeric structure.

In a second aspect, the present invention relates to a catalyst material as may be obtained by the process set out above. In preferred embodiments, the catalyst material has at least 0.1 wt % and at most 5.0 wt %, preferably at least 0.5 wt % and at most 2.0 wt %, of transition metal atoms derived from the precursor, as measured by elemental analysis.

In a third aspect, the present invention relates to the use of the catalyst material set out above as an ammonia selective catalytic reduction ($NH_3$-SCR) catalyst for nitrogen oxides (NOx) reduction.

In a fourth aspect, the present invention relates to a compound of formula: $[^tBuO_3W=O]_2(\mu\text{-}O)$.

DETAILED DESCRIPTION OF THE INVENTION

Among advantageous features of the present invention are:
- a process of grafting (chemical reactions between precursors and surface) rather than impregnating;
- grafted metals with atomic scale dispersion and a dual site surface structure, obtained from precursors with two transition metal atoms, are obtained rather than nanoparticles;
- a support which is thermally pre-treated (dehydroxylation), resulting in a desired anchoring point (OH), and grafting yields well-dispersed surface species, thereby preventing sintering of the active metal center.

In the present invention, new NH$_3$-SCR catalysts with suitable combinations of a metal selected from transition metal groups and a support material selected from CeO$_2$, ZrO$_2$ or their mixtures such as CeO$_2$—ZrO$_2$ are disclosed. These catalysts are prepared by new SOMC procedures using various organometallic metal precursors.

Conventional oxide catalysts normally consist of large metal particles supported on oxides mixed oxides. The active sites are ill-defined. The catalysts disclosed in the present invention may provide nearly 100% atomic scale dispersion of metal. Such highly dispersed metal sites do not only simply give higher density of active sites but also change the catalytic mechanism of NH$_3$-SCR, in which NH$_3$ adsorbed on metal sites can actively react with NOx adsorbed on surface of support. In other words, in the new catalysts interaction between the metal and the support material is promoted, thus enhancing the catalytic performance.

Figure 1A:
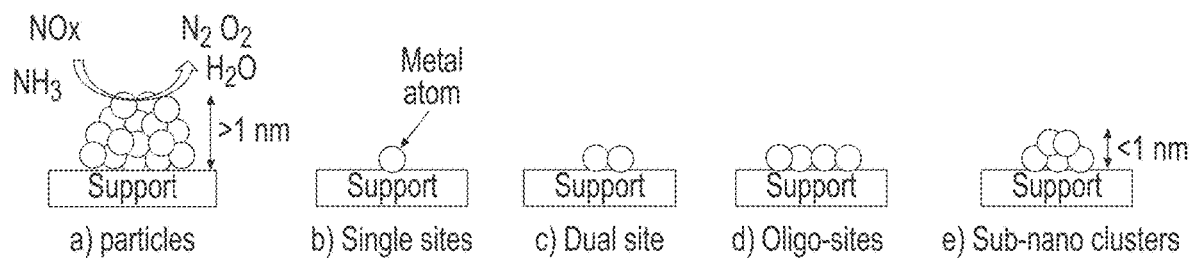
FIG. 1a shows a schematic representations of metal dispersion in catalysts synthesized by an SOMC approach (b,c,d,e) compared to nano-particle dispersion by conventional synthesis (a).

FIG. 1a shows a schematic of metal dispersion in catalysts; conventional methods in prior arts produce mixtures of these species, where a large portion is in the form of nanoparticles (no quantitative estimation of isolated species). Catalysts reported in the prior art have a common problem of low NOx conversion in NH$_3$-SCR reactions.

Figure 1B:
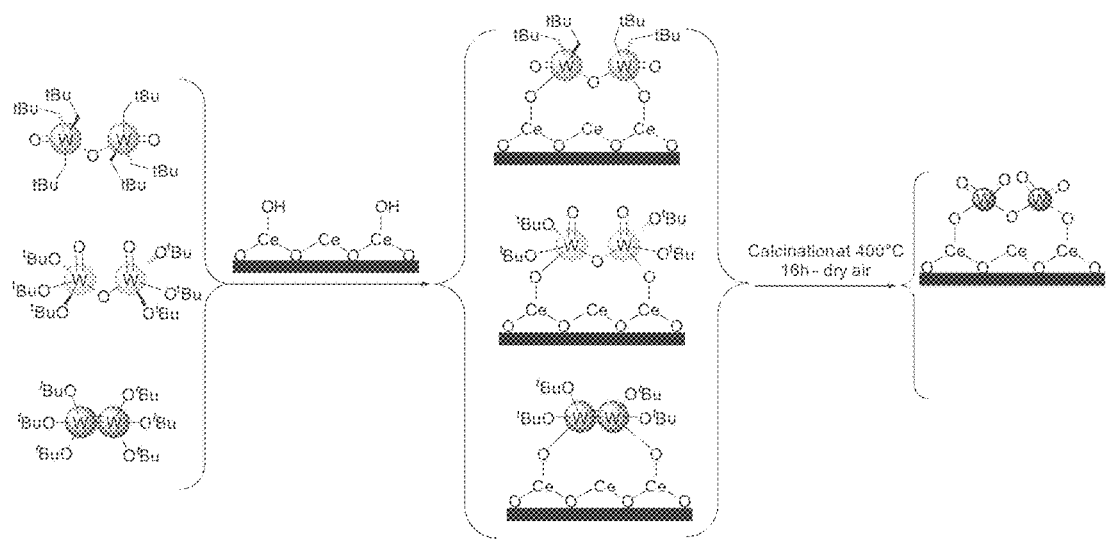
FIG. 1b shows illustrative and non-limiting examples of reactions of dimeric precursors with ceria and the formation of supported bimolecular species.

In preferred embodiments of the present invention, metal precursors having two transition metal atoms, the so-called dimeric precursors, react with surface hydroxyl groups of CeO$_2$ through bonding to two oxygens, forming dual site surface species, an illustrative and non-limiting example for which is shown schematically for WOx/CeO$_2$ catalysts in FIG. 1b.

Figure 2:
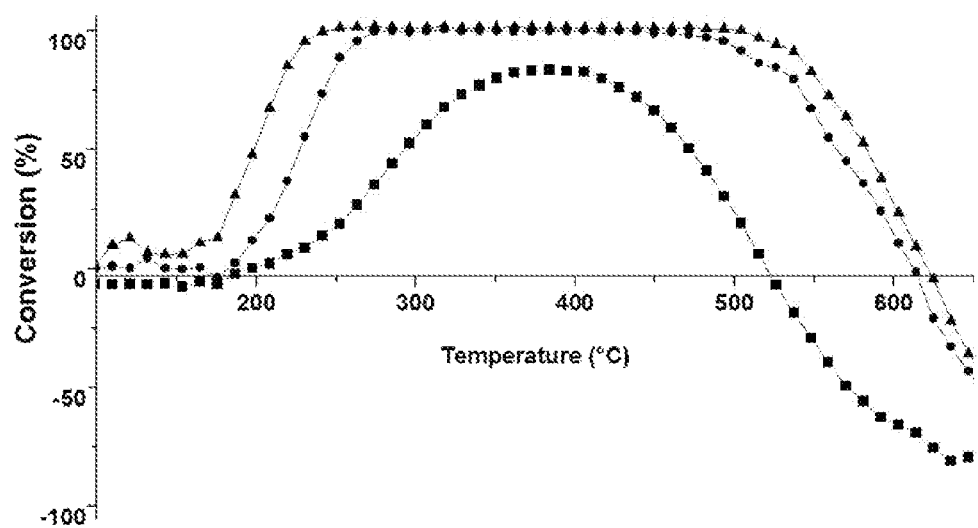
FIG. 2 shows $NO_x$ conversion as functions of the temperature for the catalyst prepared from dimeric $[(^tBuCH_2)_3W(=O)]_2\mu\text{-}O$ (solid triangles), monomeric $(^tBuCH_2)_3W(\equiv C^tBu))$ tungsten precursors (solid circles) and classical impregnation of $(NH_4)_{10}H_2(W_2O_7)_6$ (solid squares).
Figure 3A:
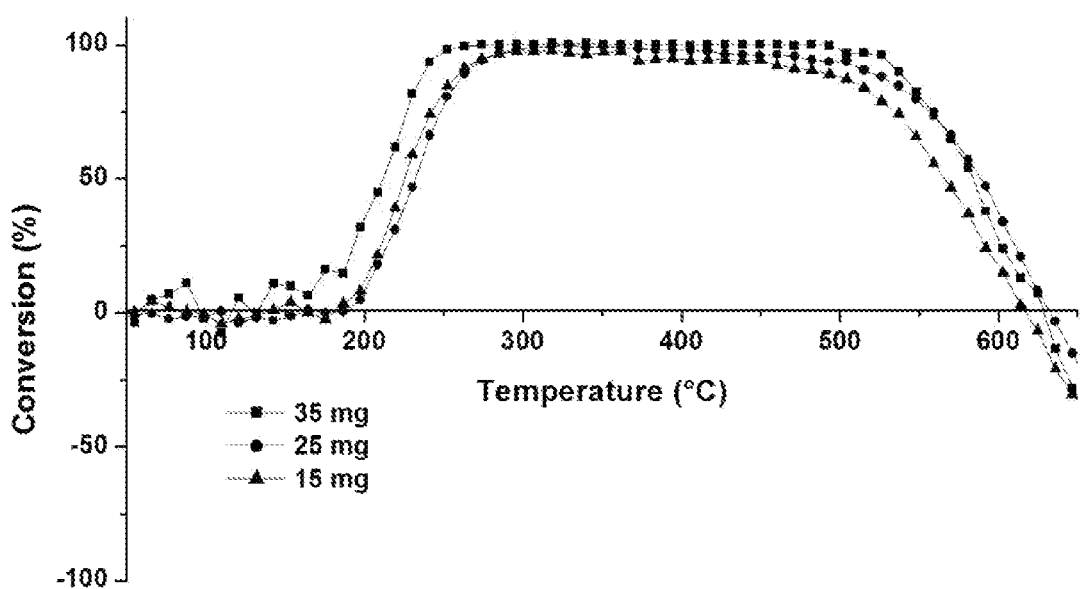
FIG. 3a shows $NO_x$ conversion as a function of the temperature using different amounts (15, 25 and 35 mg) of the catalyst WOx/$CeO_2$ prepared from dimeric $[(_tBuCH_2)_3W(=O)]_2(\mu\text{-}O))$ precursor.
Figure 3B:
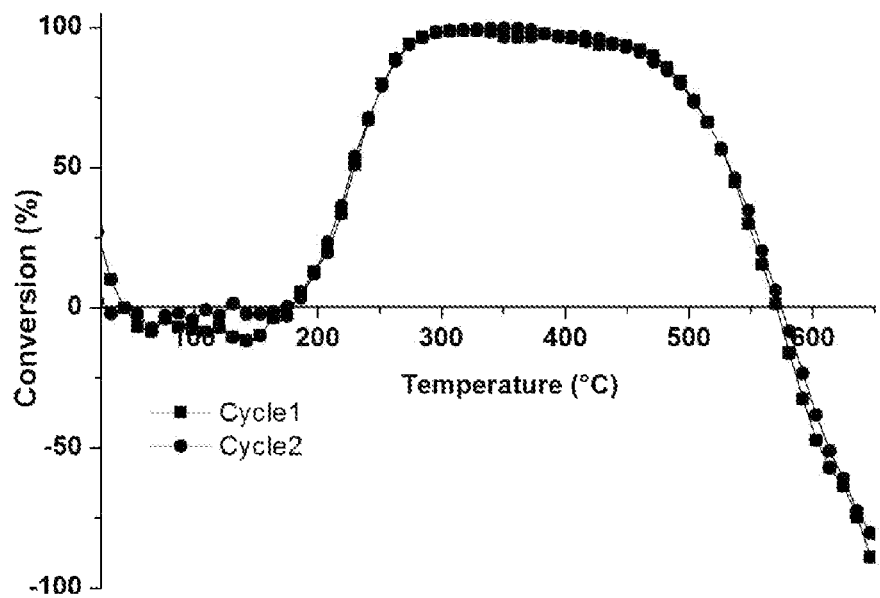
FIG. 3b shows NOx conversion as function of temperature over WOx/$CeO_2$ prepared from dimeric $(^tBuO)_3W\equiv W(^tBuO)_3$ precursor.
Figure 3C:
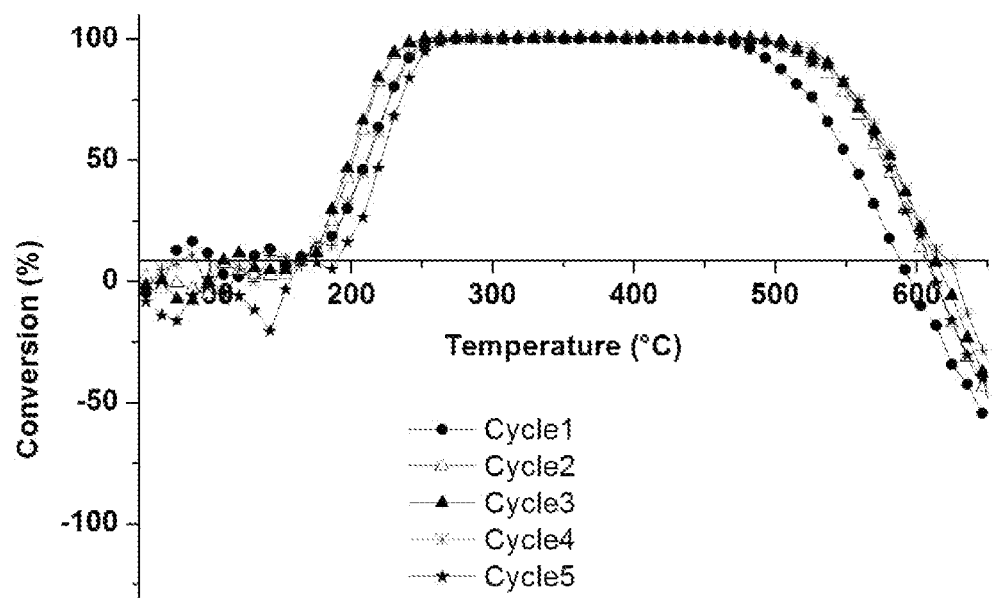
FIG. 3c shows $NO_x$ conversion as a function of the temperature using the catalyst prepared from dimeric $[(^tBuCH_2)_3W(=O)]_2(\mu\text{-}O)$ precursor.
Figure 3D:
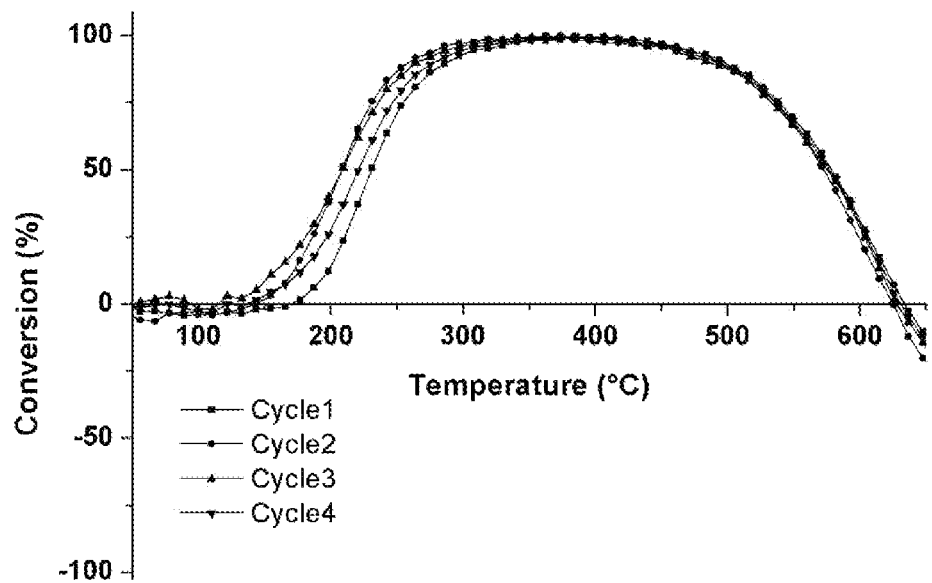
FIG. 3d shows $NO_x$ conversion as a function of the temperature using the catalyst prepared from dimeric $[^tBuO_3W(=O)]_2(\mu\text{-}O)$ precursor.

The catalyst obtained according to the invention using the dimeric precursors ([$^t$BuO$_3$W(═O)]$_2$(μ-O)) is clearly higher than the catalytic activity of their counterpart prepared from the monomeric Schrock-type tungsten neopentyl/neopentylidyne complex W(≡C$^t$Bu)(CH$_2$$^t$Bu)$_3$ (Bu=butyl). This catalyst in turn showed higher catalytic activity than the catalyst prepared by classical impregnation using (NH$_4$)$_{10}$H$_2$(W$_2$O$_7$)$_6$ (FIG. 2).

The catalytic performances of the dimeric catalyst for the NOx reduction are carried using various amounts of the catalyst prepared from prepared dimeric [($^t$BuCH$_2$)$_3$W(═O)]$_2$(μ-O)) precursor (35 to 25 and 15 mg). FIG. 3 shows that performance of samples does not change much when the sample weight decreases by more than half, indicating their high activity.

Figure 4A:
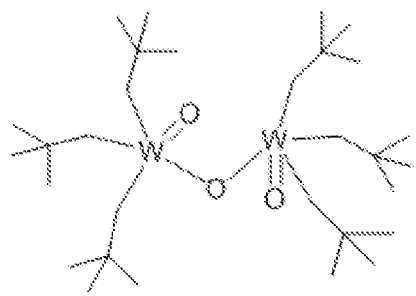
FIG. 4a shows dimeric structures in solution (W—O—W) and
FIG. 4b monomeric structures in solution (M-OEt)$_2$.
Figure 4B:
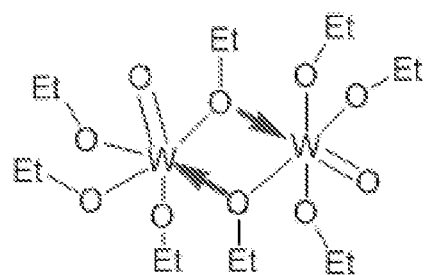

Preferred metal precursors in the present invention show a well-defined dimeric structure, and the dimeric structure remains in solution, due to the special sigma bond between W—O—W (FIG. 4a); whereas normal metal precursors consist of only a dative coordination between the O and W (FIG. 4b), which dissociate into monomeric species in a solvent.

Appropriate support materials, in the form of ceria (CeO$_2$) and/or zirconia (ZrO$_2$), can be obtained from commercial suppliers. For example, ceria can be obtained from suppliers such as SOLVAY and typically has a specific surface area of about 250 m$^2$/g.

In an advantageous embodiment to provide a certain controlled concentration of OH groups on the support material, in order to provide the material in step (a), of the process of the invention, hydration of the oxide support material (as received in a typical commercial sample) may be carried out in a first instance using moisture, followed by dihydroxylation through heating under reduced pressure. The concentration of OH groups is notably influenced by the temperature of the treatment. In a generally appropriate process for treating a ceria (CeO$_2$) support material, a pressure of about 10$^{-5}$ mbar, at a temperature of 200° C. for typically 16 h constitute advantageous treatment conditions. The concentration of OH groups on the support material can for example be determined by chemical titration through reaction with Al($^t$Bu)$_3$—the latter reacts quantitatively with surface hydroxyl groups releasing one equivalent of isobutane per OH.

Preferred support materials in the present invention are ceria (CeO$_2$) or ceria-zirconia (CeO$_2$—ZrO$_2$) supports. Concerning the mixed ceria-zirconia (CeO$_2$—ZrO$_2$) support, the amount of ZrO$_2$ can be in the range 20-80 wt %, preferably between 30-60 wt %. A higher content of ZrO$_2$ may in practice decrease the concentration of OH groups. CeO$_2$ and CeO$_2$—ZrO$_2$ are not known in the prior art as good support materials for SCR catalysts—these materials normally have lower specific surface area (SSA) than SiO$_2$.

In grafting step (b) of the invention, the support material having a controlled concentration of hydroxyl groups (OH) is reacted with a grafting reagent.

Concerning the functionalization (grafting) stage, generally appropriate solvents include polar solvents and non-polar solvents, such as in particular hydrocarbon solvents. Specific example of solvents include: pentane, hexane, heptane, toluene, xylenes, and mesitylene. In terms of reaction conditions for grating, temperatures may range from room temperature up to reflux conditions and the reaction time may appropriately be from 1 hour to 60 hours.

Concerning the activation (calcination) process, the activation process may be carried out at temperatures from 200° C.-700° C., preferably between 300° C. and 500° C. Calcination may appropriately be carried out in an oxygen-containing atmosphere, such as dry air.

In preferred embodiments of the invention, the process is carried out such that the compound obtained in step (b) has at least 0.1 wt % and at most 5.0 wt %, preferably at least 0.5 wt % and at most 2.0 wt %, of transition metal element derived from the precursor as may be determined in elemental analysis of the compound obtained in step (b).

In preferred embodiments of the invention, the process is carried out such that the compound obtained after calcining step (c) has at least 0.1 wt % and at most 5.0 wt %, preferably at least 0.5 wt % and at most 2.0 wt %, of transition metal element derived from the precursor, in elemental analysis of the compound obtained after calcining step (c).

Transition metal atoms derived from the precursors used in the present invention, and which may be identified in elemental analysis of the compound obtained after step (b) or (c) of the process of the present invention, may be chosen from the group consisting of: W, Mo, Cr, Ta, Nb, V, Mn. Metals of Group 6 (W, Mo, Cr) and group 5 (Ta, Nb, V) are preferred, and tungsten (W) is particularly preferred.

In the process for preparing a catalyst material of the present invention, the support material having surface hydroxyl (OH) groups is reacted with a precursor containing two transition metal atoms, each chosen independently from the group consisting of: W, Mo, Cr, Ta, Nb, V, Mn.

In preferred embodiments, the precursor has the two transition metal atoms directly bonded to one another or linked through one or more oxygen atoms. Further, in preferred embodiments, the transition metal atoms of the precursor are identical.

In preferred embodiments, the transition metal atoms of the precursor are bonded to oxygen atoms, to nitrogen atoms and/or to one or more of the following types of groups, each of which may be substituted or unsubstituted: alkyl, aryl, alkoxy, phenoxy. Nitrogen atoms to one or both of the transition metal atoms of the precursor may be bonded as amines or imines, or as heterocylic or heteroaromatic nitrogen atoms. The aryl groups include not only homoaromatic and heteroaromatic groups, but anionic aromatic species such as cyclopentadienyl.

In particularly preferred embodiments, the precursor is selected from the group consisting of: $[(^tBuCH_2)_3W=O]_2$ ($\mu$-O); $[^tBuO_3W=O]_2(\mu$-O); $(^tBuO)_3W\equiv W(^tBuO)_3$.

Following Table 1 lists different dimeric precursors that were synthesized following procedures reported in literature. It is considered by the present inventors that these dimeric precursors can be used for preparation of SCR catalysts with improved performance following SOMC procedures described in the present invention.

TABLE 1

Further reported dimeric precursors that may be used in SOMC procedures for preparation of catalysts with dual site surface structures Group VI (Cr)

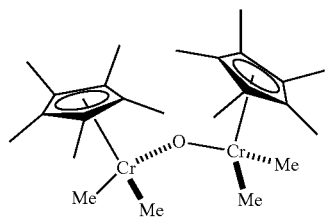

J. Am. Chem. Soc. 1992, 114, 1892-1893

TABLE 1-continued

Further reported dimeric precursors that may be used in SOMC procedures for preparation of catalysts with dual site surface structures Group VII (Mn)

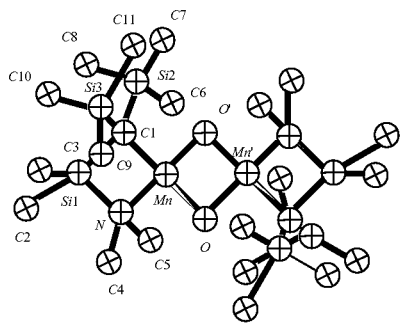

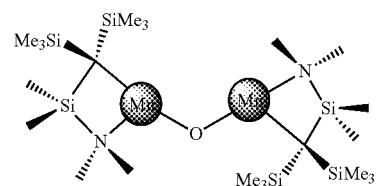

Journal of Organometallic Chemistry 2002, 649, 121

TABLE 2

Further reported precursors and preparation procedures that may be used to synthesize dimeric precursors that may be used in the SOMC procedures for preparation of catalysts with dual site surface structures Group V — Starting material(s)

Vanadium dimer: Di-$\mu$-oxo bis[oxovanadium (V)]complexes derived from: Tridentate Schiff bases 2-ethoxy-6-[(2-methylaminoethylimino)-methyl] phenol

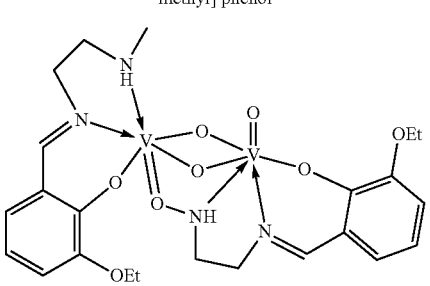

TABLE 2-continued

Further reported precursors and preparation procedures that may be used to synthesize dimeric precursors that may be used in the SOMC procedures for preparation of catalysts with dual site surface structures Tridentate Schiff bases 2-methoxy-6-[(2-phenyl-aminoethylimino)methyl]phenol (*Synthesis and reactivity in inorganic, Metal-organic and nano-metal chemistry, 2013, 43, 1001*)

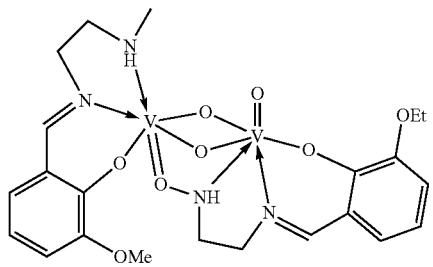

Synthesis of dimeric precursor

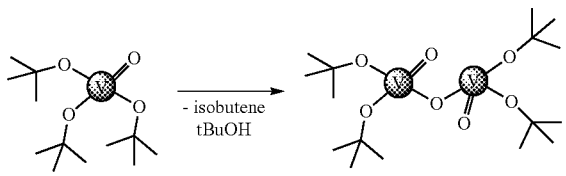

In preferred embodiments of the present invention, Group 5 or Group 6 metals are used, which are not known as good active sites for $NH_3$-SCR when incorporated into zeolite materials. Although metals from these groups may have been used as $NH_3$-SCR catalysts in single form such as $V_2O_5$, it was not expected that they would show high $NH_3$-SCR performance when dispersed over other oxides as support materials. It is therefore considered by the present inventors that it was not easy to predict that the proposed combinations of the metals and support materials in the present invention would lead to significantly improved $NH_3$-SCR performance, or that atomic scale dispersion of metals over oxides would significantly improve $NH_3$-SCR performance.

Catalyst materials of the present invention can interact with gas reactants in a catalytic process. In certain embodiments the catalyst materials may be applied to an inert substrate such as a metal plate, corrugated metal plate, or honeycomb. Alternatively, the catalyst material may be combined with other solids such as fillers and binders in order to provide an extrudable paste that may be transformed into a porous structure such as a honeycomb.

A catalytic converter based on catalyst materials of the present invention may appropriately include the catalyst material disposed on a supporting element such that passages are made available for the passage of exhaust gases, and the supported catalyst material may appropriately be housed in a metal casing. The metal casing is generally connected with one or more inlets such as pipes for transferring exhaust gases towards the catalyst material.

In order to function in $NH_3$-SCR catalysis, the catalytic converter is appropriately connected with a source of ammonia in order for the latter to come into contact with exhaust gas. The ammonia can be provided as anhydrous ammonia, aqueous ammonia, urea, ammonium carbonate, ammonium formate, or ammonium carbamate. In some embodiments, an ammonia storage tank is used to contain the ammonia source.

An SCR system can be integrated into various systems that require NOx reduction. Applications include engine systems of a passenger vehicle, truck, utility boiler, industrial boiler, solid waste boiler, ship, locomotive, tunnel boring machine, submarine, construction equipment, gas turbine, power plant, airplane, lawnmower, or chainsaw. Catalytic reduction of NOx using catalyst materials according to the present invention is therefore of general interest in situations where fossil fuels are used for power generation, not just for transportation but also in power generation devices, and domestic appliances using fossil fuels.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXPERIMENTAL SECTION—EXAMPLES

The following experimental section illustrates experimentally the practice of the present invention, but the scope of the invention is not to be considered to be limited to the specific examples that follow.

Examples of Preparation of Dimeric Metal Precursors
Synthesis of Dimeric [($^t$BuCH$_2$)$_3$W≡O]$_2$(μ-O)

Figure 5A:
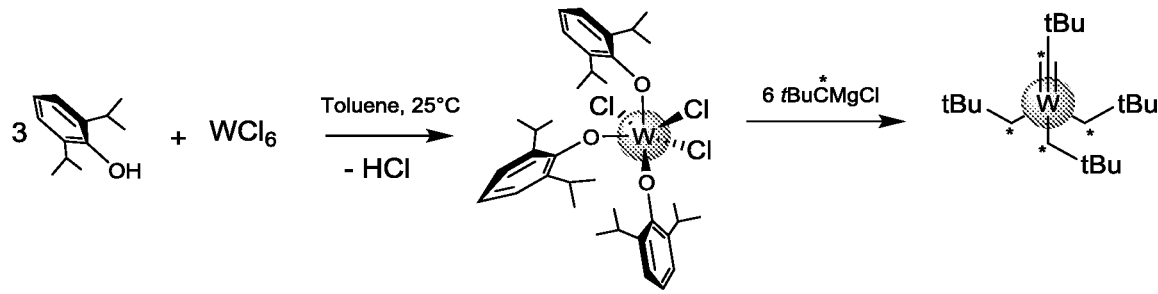
FIG. 5a shows a synthesis of $W(\equiv C^tBu)(CH_2tBu)_3$.
Figure 5B:
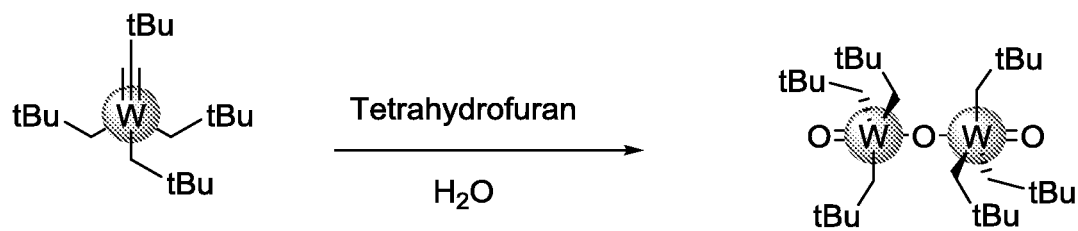
FIG. 5b shows a synthesis of $[(^tBuCH_2)_3W=O]_2(\mu\text{-}O)$, where $\mu$-O (or $\mu^2$-O) indicates that the oxygen atom is bridging and shared between two tungsten atoms.

Synthesis was carried out through 3 steps (cf. FIGS. 5a and 5b).

The molecular precursor W(≡CtBu)(CH$_2$$^t$Bu)$_3$ (FIG. 5a) was prepared by modification of the reported synthesis (Clark, D. N.; Schrock, R. R.; Journal of the American Chemical Society 1978, 100, 6774-6776; Schrock, R. R.; Sancho, J.; Pederson, S. F.; Inorganic Syntheses 1989, 26, 44-51; Schrock, R. R.; Clark, D. N.; Sancho, J.; Wengrovius, J. H.; Rocklage, S. M.; Pedersen, S. F.; Organometallics 1982, 1, 1645-1651).

First W(OAr)$_3$Cl$_3$ (Ar=2,6 diisopropyl benzyl) was prepared by addition of 2,6-diisopropyl phenol to WCl$_6$ in toluene. After washing of the excess propofol with pentane? the product is collected in black microcrystalline form. A 1.6 M solution of Mg(CH$_2$$^t$Bu)Cl in ether (43 ml, 68.8 mmol) was added dropwise to a solution of W(OAr)$_3$Cl$_3$ (9.3 g, 11.3 mmol) in 100 ml of ether at 0° C. The ether was removed under vacuum and the remaining solid was extracted three times with 50 ml of pentane. All volatile products were then removed under vacuum and the remaining oily product was sublimed at 80° C. and $10^{-5}$ mbar giving 3.2 g (60%) of yellow solid with characteristics in NMR:

$^1$H NMR (C$_6$D$_6$, 300 MHz): δ 1.56 (9H, s, ≡CC(CH$_3$)$_3$), 1.15 (27H, s, CH$_2$C(CH$_3$)$_3$), 0.97 (6H, s, CH$_2$C(CH$_3$)$_3$), $^2$J(HW)=9.7 Hz).

$^{13}$C{$^1$H} NMR (C$_6$D$_6$, 75.5 MHz): δ 316.2 (≡CC(CH$_3$)$_3$, $^1$J(CW)=230 Hz), 103.4 (CH$_2$C(CH$_3$)$_3$, $^1$J(CW)=90 Hz), 52.8 ((≡CC(CH$_3$)$_3$), 34.5 (CH$_2$C(CH$_3$)$_3$), 34.4 (CH$_2$C(CH$_3$)$_3$), 32.4 (≡CC(CH$_3$)$_3$).

Synthesis of [($^t$BuCH$_2$)$_3$W=O]$_2$(μ-O) (FIG. 5b)

W(≡C$^t$Bu)(CH$_2$$^t$Bu)$_3$ (3 g, 6.4 mmol) was dissolved in 20 ml of THF and 10 ml of water was added in one portion with rapid stirring. After an hour the white precipitate was filtered off and dried under vacuum to give 2.4 g (90%) of the desired complex with NMR characteristics:

$^1$H NMR (C$_6$D$_6$, 300 MHz): δ 1.98 (12H, s, CH$_2$C(CH$_3$)$_3$), 1.31 (54H, s, CH$_2$C(CH$_3$)$_3$).

$^{13}$C{1H} NMR (C$_6$D$_6$, 75.5 MHz): δ 91.9 (CH$_2$C(CH$_3$)$_3$), 1J(CW)=93 Hz), 35.4 (CH$_2$C(CH$_3$)$_3$), 32.9 (CH$_2$C(CH$_3$)$_3$).

Synthesis of Dimeric Precursor [$^t$BuO$_3$W=O]$_2$(μ-O)

Figure 6A:
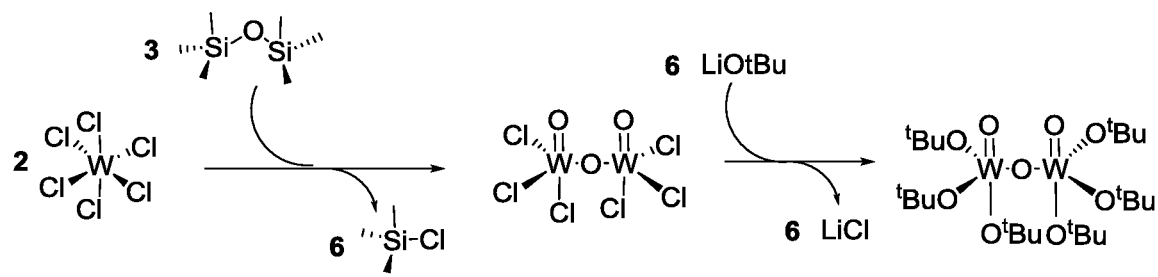
FIG. 6a shows a synthesis of $[^tBuO_3W(O)]_2(\mu\text{-}O)$, where $\mu$-O (or $\mu^2$-O) indicates that the oxygen atom is bridging and shared between two tungsten atoms.

This synthesis was carried out through two steps (FIG. 6).

Synthesis of [Cl$_3$W=O]$_2$(μ-O)

A dichloromethane solution of (Me$_3$Si)$_2$O (6.15 g, 12.6 mmol in 30 mL of CH$_2$Cl$_2$ was added dropwise to a suspension of WCl$_6$ (10.0 g, 25.2 mmol) in dichloromethane (60 mL) at 0° C. over a period of 30 min. The mixture was stirred for a further 60 min. The supernatant liquor was then removed by filtration and the solid was recovered and dried. Yield 7.52 g, 95%.

Synthesis of [$^t$BuO$_3$W=O]$_2$(μ-O)

A solution of LiOCMe$_3$ (5.45 g, 0.068 mol) dissolved in 60 mL of THF was added dropwise to a solution of [Cl$_3$W=O]$_2$(μ-O), (7.0 g, 0.011 mol) dissolved in 20 mL of THF at 0° C. The reaction mixture was warmed to room temperature and stirred for 0.5 h and the THF was removed in vacuo. Then the product was extracted by toluene and crystallized at −30° C., to yield colourless crystals (75%) with NMR characteristics:

$^1$H NMR (C$_6$D$_6$, 300 MHz): δ 1.98 (54H, s, OC(CH$_3$)$_3$).

$^{13}$C{$^1$H} NMR (C$_6$D$_6$, 75.5 MHz): δ 81.9 (OC(CH$_3$)$_3$), 33 (OC(CH$_3$)$_3$).

Elemental analysis for W, C and H theoretical (experimental) was: 43 (42), 33.7 (34.1), 6.3 (7) respectively.

Synthesis of Dimeric Precursor ($^t$BuO)$_3$W≡W($^t$BuO)$_3$

Synthesis of Monomeric Intermediate

Figure 6B:
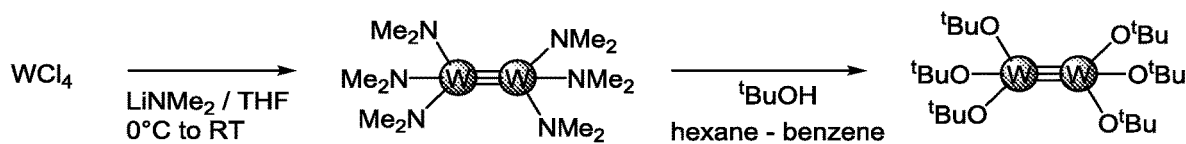
FIG. 6b shows a synthesis of $^tBuO_3W\equiv W^tBuO_3$.

The ($^t$BuO)$_3$W≡W($^t$BuO)$_3$ dimeric tungsten precursor is obtained in two steps (FIG. 6b). Corresponding suntheses have been provided in the literature: Chisholm, M. H.; Extine, M. W.; *J. Am. Chem. Soc.* 1975, 97, 5625; Chisholm, M. H.; Gallucci, J. C.; Hollandsworth, C. B.; Polyhedron 2006, 25, 827.

W$_2$(NMe$_2$)$_6$

To a slurry of WCl$_4$ (4.0 g, 0.0122 mol) in 20 ml of ether, a solution of LiNMe$_2$, (2.5 g, 0.05 mol) in 40 ml of tetrahydrofuran (THF) is added dropwise at 0° C. When the lithium amide addition is complete, the reaction mixture is stirred at 0° C. for 3 h. After that the solution is allowed to warm to room temperature, stirred during ca. 20 h and then refluxed for 2 h. The yellow solution of W$_2$(NMe$_2$)$_6$ is filtered through Celite and the solvent was removed under vacuum. The W$_2$(NMe$_2$)$_6$ is extracted from the a yellow-brown residue using hexane. For further purification, the product is sublimed and recrystallized to yield bright yellow crystals of W$_2$(NMe$_2$)$_6$. 3.4 ppm (C$_6$D$_6$, 25° C.). $^1$H NMR (C$_6$D$_6$, 300 MHz): δ 3.25 (36H, s, N(CH$_3$)$_2$).

($^t$BuO)$_3$W≡W($^t$BuO)$_3$

W$_2$(NMe$_2$)$_6$ (1 g) is dissolved in 20 ml of toluene and 7 ml of $^t$BuOH in 5 ml of hexane are added dropwise. After that the reaction mixture is stirred during 6 h at room temperature. The solvent and the volatiles are removed under vacuum. The residue is dissolved in hexane, then crystalized at −30° C. to yield red crystals 0.5 mg (30%) with NMR characteristics: $^1$H NMR (C$_6$D$_6$, 300 MHz): δ 1.26 (36H, s, C(CH$_3$)$_2$).

Example 1—Preparation of Catalyst W$_2$O$_x$/CeO$_{2-200}$ Using [($^t$BuCH$_2$)$_3$W=O]$_2$(μ-O)

Preparation of CeO$_2$

In pre-treatment of the support material, ceria (CeO$_2$), Ceria Actalys HAS-5 Actalys 922 from Solvay (Rare Earth La Rochelle), CeO$_{2-(200)}$ (ceria with specific surface area of 210±11 m$^2$ g$^{-1}$), was calcined for 16 h at 500° C. under a flow of dry air, and evacuated under vacuum at high temperature. After moisture, re-hydratation under inert atmosphere the ceria was partially dehydroxylated at 200° C. under high vacuum ($10^{-5}$ Torr) for 15 h to give a yellow solid having a specific surface area of 200±9 m$^2$·g$^{-1}$.

To achieve the grafting and the functionalization of surface hydroxides under optimum conditions, it is desirable to know their amount. Among the reliable quantification methods is chemical titration by reacting them using Al($^i$Bu)$_3$. This latter is known to react quantitatively with surface hydroxyl groups releasing one equivalent of isobutane per OH. The quantification of isobutane by GC shows that Al($^i$Bu)$_3$ reacts with OH groups of ceria giving 0.7 mmol OH/g.

Synthesis of Dimeric Precursor

Dimeric precursors were synthesized as set out in the above synthesis examples preceding Example 1.

Grafting of [($^t$BuCH$_2$)$_3$W=O]$_2$(μ-O) Onto CeO$_{2-200}$

Figure 7A:
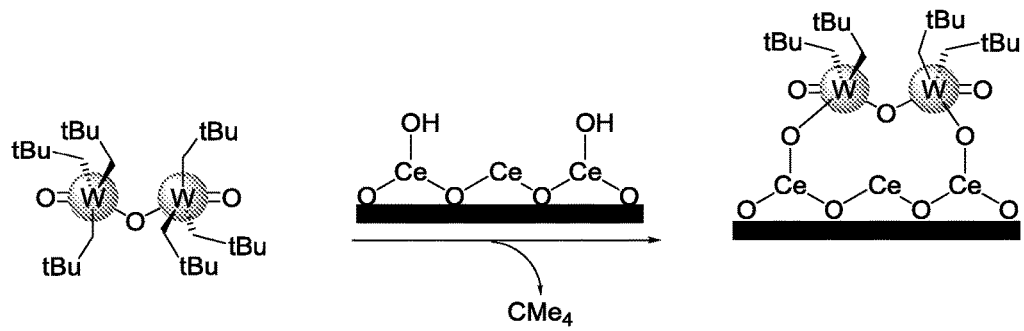
FIG. 7a shows a surface organometallic reaction of $[(^tBuCH_2)_3W=O]_2(\mu\text{-}O)$ with surface hydroxides of $CeO_2$ dehydroxylated at 200° C.

The grafting was carried out in a double Schlenk tube. The molecular precursor [($^t$BuCH$_2$)$_3$W=O]$_2$(μ-O) and the ceria partially dehydroxylated at 200° C. were mixed in toluene for 4 h. The solid [($^t$BuCH$_2$)$_3$W=O]$_2$(μ-O)/CeO$_{2-200}$ was washed three times with toluene. The resulting yellow powder was dried under vacuum ($10^{-5}$ Torr) (FIG. 7a).

Figure 7B:
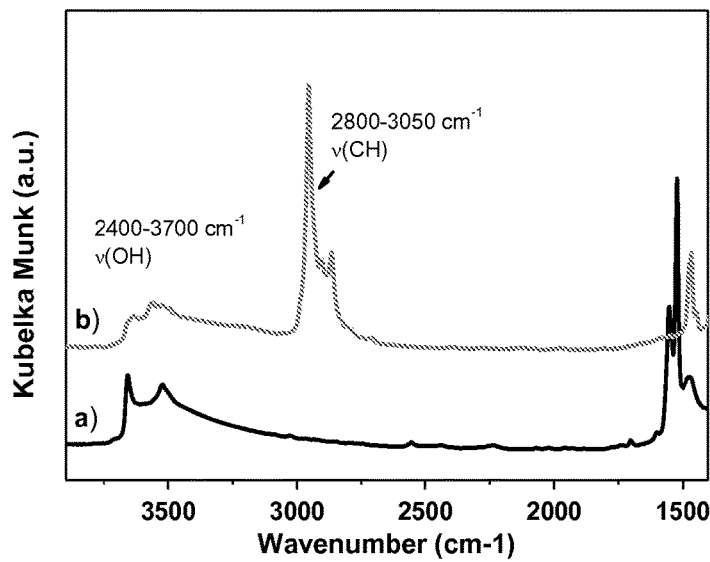
FIG. 7b shows a DRIFT spectrum of a) ceria dehydroxylated at 200° C., and b) after grafting of $[(tBuCH_2)_3W=O]_2(\mu\text{-}O)$.

The reaction is monitored by DRIFT spectroscopy (FIG. 7b). After the grafting reaction and the removal of the excess complex, the bands between 3400 and 3700 cm$^{-1}$ attributed to different vibration mode of v(CeO—H) at 3747 cm$^{-1}$ completely disappeared. New bands in the 3100-2850 cm$^{-1}$ range and between 1620-1400 cm$^{-1}$ are observed, these peaks are characteristic of aliphatic v (C—H) and δ(C—H) vibrations of the chemisorbed ligands on surface. These data confirm the chemical reaction between surface hydroxyl groups of ceria with [($^t$BuCH$_2$)$_3$W=O]$_2$(μ-O) tungsten precursor.

Figure 8:
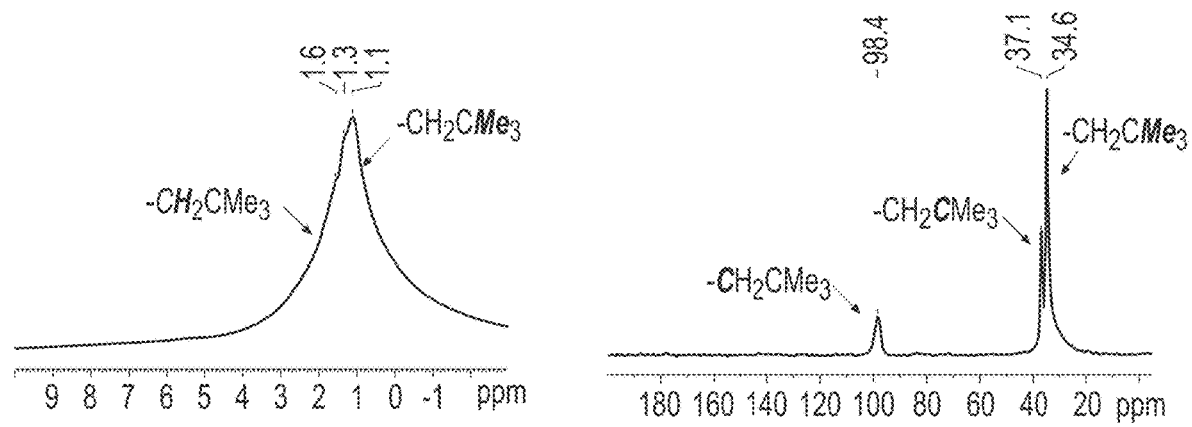
FIG. 8 shows $^1H$ MAS (left) and $^{13}C$ (right), NMR spectra of $[(^tBuCH_2)_3W=O]_2(\mu\text{-}O)/CeO_{2\text{-}200}$.
Figure 9:
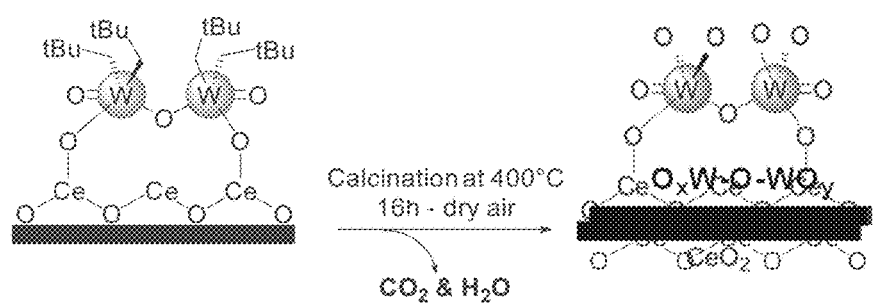
FIG. 9 shows a preparation of the catalyst $\{W_2O_x\}_a/CeO_{2\text{-}200}$ through calcination of the intermediate material. Although the W—O—W structure is confirmed the surrounding structure is not fully defined at this time and, without wishing to be bound by any possible interpretation, the schematic diagram shows a current hypothesis. The distribution of, in particular, O or OH that can bond to W, may not be as shown.

The $^1$H solid state NMR spectrum (FIG. 8) shows a main resonance at 1.1 ppm due to the methyl groups with a shoulder around 2 ppm consistent with the presence of —$CH_2C(CH_3)_3$. The $^{13}C$ CPMAS NMR spectrum shows the presence of three well defined peaks at 98, 37 and 34 ppm corresponding —$CH_2C(CH_3)_3$, —$CH_2C(CH_3)_3$ and —$CH_2C(CH_3)_3$ respectively.

Activation to Obtain Catalyst $W_2O_x/CeO_2$

The intermediate material $[(^tBuCH_2)_3W=O]_2(\mu\text{-}O)/CeO_{2\text{-}200}$ was then calcined in a glass reactor under continuous flow of dry air at 500° C. for 16 h. The recovered material $(W_2O_x)_d/CeO_{2\text{-}200}$ prior to a catalytic test was characterized. The calcination gives a greyish powder referred to as $(W_2O_x)_d/CeO_{2\text{-}200}$.

Figure 10:
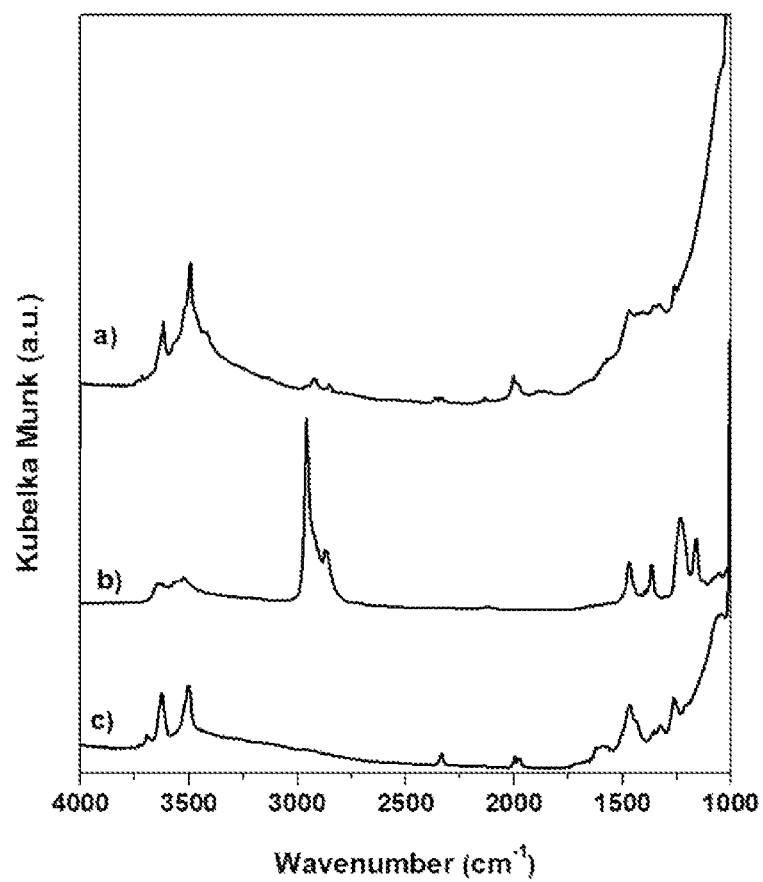
FIG. 10 shows DRIFT spectra of a) ceria dehydroxylated at 200° C., b) ceria after grafting of $[(^tBuCH_2)_3W=O]_2(\mu\text{-}O)$ and c) after calcination of the resulted sample at 500° C. under dry air during 16 h.

The infrared spectrum of FIG. 10 shows a disappearance of the $v(C-H)$ and $\delta(C-H)$ bands, indicating the total decomposition of the organic fragments. Moreover, new bands in the region of OH stretching vibration are observed between 3400 and 3700 cm$^{-1}$ attributable to $v(CeO-H)$ and at 3490 cm$^{-1}$ assignable to $v(O-H)$.

The BET surface area of the resulted material measured by $N_2$ adsorption is ca. 186±9 m$^2$/g closely approximated the one found for the neat ceria calcined under the same condition, which was ca. 207±10 m$^2$/g. This would mean that the crystal structure is preserved and the grafting as well as the calcination process induce no particle sintering.

Figure 11:
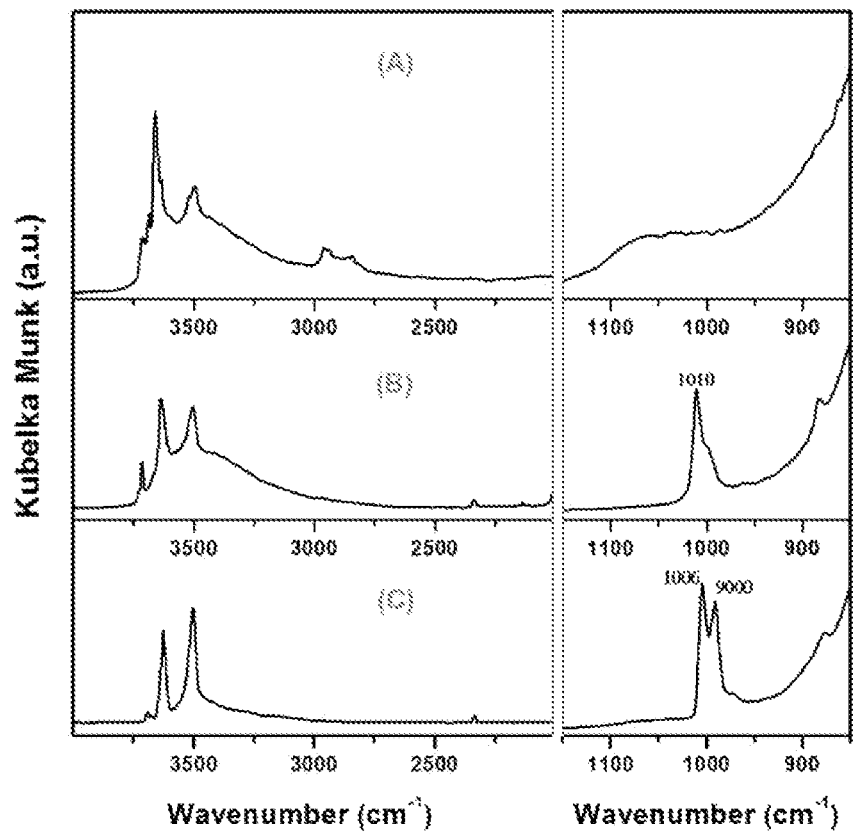
FIG. 11 shows DRIFT spectra of ceria dehydroxylated at 200° C. (A), catalyst prepared from dimeric $[(^tBuCH_2)_3W=O]_2(\mu\text{-}O)$ (B), and catalyst obtained from monomeric $W(\equiv C^tBu)(CH_2^tBu)_3$ precursor (C).

The catalysts prepared from dimeric precursor $[(^tBuCH_2)_3W=O]_2(\mu\text{-}O)$ was analyzed by DRIFT and compared to the catalysts prepared from monomeric $W(\equiv C^tBu)(CH_2{}^tBu)_3$ precursor. The IR spectrum of calcined catalysts (FIG. 11 C) showed in addition to the absorption bands of hydroxyl groups, supplementary peaks at 1006, 900 cm$^{-1}$, attributed to $v(W-O_t)$ and $v(W-O_s-W)$, respectively where t and s correspond to different oxygen positions (terminal, shared) (*Micropor Mesopor Mat* 132, 103-111). This is even more remarkable given that the comparison with the IR of the catalysts prepared using monomeric precursor (FIG. 11 B) showed only one signal ca. 1010 cm$^{-1}$ attributed to the W—Ot as expected since only isolated species are formed in this material. It is interesting to note that these IR band are not observed for the support (FIG. 11).

A satisfactory understanding of the overall dispersion of the tungsten adspecies was provided by UV-Vis-DRS analysis. It has been largely used to elucidate the structure of supported $WO_x$ as well as mixed oxides containing W. More specifically, it has been demonstrated that the UV-vis DRS edge energy of the ligand to metal charge transfer (LMCT) transitions, Eg (eV) bears a linear relationship to the number of bridging W—O—W bonds for $WO_x$ coordinated structure.

Figure 12:
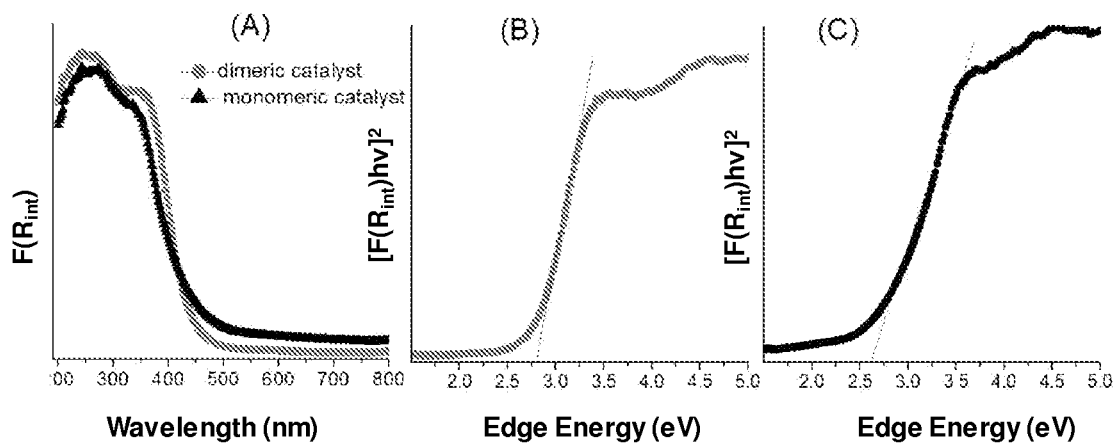
FIG. 12 shows diffuse-reflectance Uv-Vis spectra of the $WO_x/CeO_2$ prepared from dimeric and monomeric precursor (A), UV-Vis DRS spectrum and edge energy of $WO_x/CeO_2$ prepared from monomeric (B) and dimeric (C) precursors.

The presence of strong absorbing material can entail and cause distortions of the DRS spectra and affect the consistency of the $E_g$ value. Unfortunately this is the case in the present work where the LMCT transitions of the W (VI) cations and the support $CeO_2$ overlap. However, it was demonstrated that this effect can be mitigated either by dispersing the sample in a transparent matrix such as MgO, SiO$_2$, and Al$_2$O$_3$ (*J. Phys. Chem. B,* 104, 6, 2000), or by considering the support as a baseline reference, or quite simply, by additional data manipulation. The data processing includes UV-Vis DRS spectrum deconvolution into multiple signals or by extraction the DRS spectrum of tungsten oxide species by subtracting the absorption bands of the support. For this study prior to the data UV-Vis data acquisition, the samples were diluted in BaSO$_4$. From the UV-Vis spectra showed in FIG. 12A, a band at 239 nm attributable to the charge-transfer transitions between oxygen and isolated orthotungstate W(VI) is present and may also overlap with the bands of ceria due to Ce$^{3+}$, O$^{-2}$ and Ce$^{4+}$ O$^{-2}$ charge transfers. At 346 nm, the feature is most likely due to LMCT bands of bridging W—O—W as found for the $K_2W_2O_7$ linear chain. This was confirmed by the band edge energies, $E_g$ determination (3.8 ev) close to the one found for the isolated tetrahedral centers in Na$_2$WO$_4$ compound (Eg=4.7 eV), and the difference is attributed to the structure distortion as reported in *J. Phys. Chem. C*, Vol. 111, No. 41, 2007 15.

The band edge energies $E_g$ of the catalysts prepared from dimeric precursors showed Eg even lower (2.6 eV), close to that found for dimeric $O_3W-O-WO_3$ structures cf. *J. Phys. Chem. C,* 111, 41, 2007.

Example 2: Preparation of Catalyst $W_2Ox/CeO_2$ From $[^tBuO_3WO]_2(\mu\text{-}O)/CeO_2$ Preparation of CeO$_2$ CeO$_2$ was prepared as in Example 1 above.

Synthesis of Precursor

Precursors were synthesized as set out in the above synthesis examples preceding Example 1.

Grafting

Figure 13:
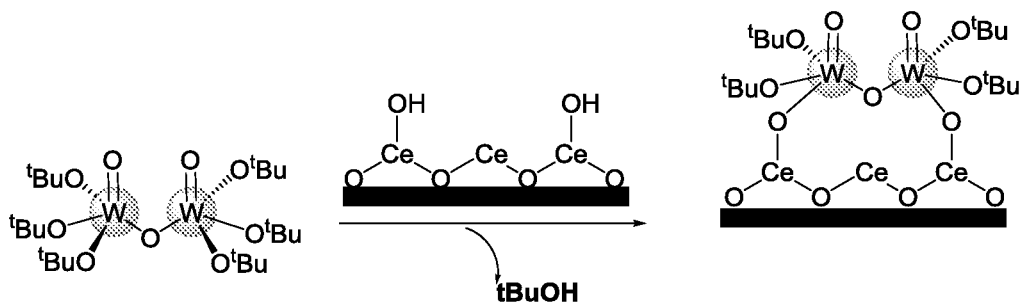
FIG. 13 shows surface organometallic reaction of $[^tBuO_3WO]_2(\mu\text{-}O)$ with surface hydroxides of $CeO_2$ dehydroxylated at 200° C.
Figure 14:
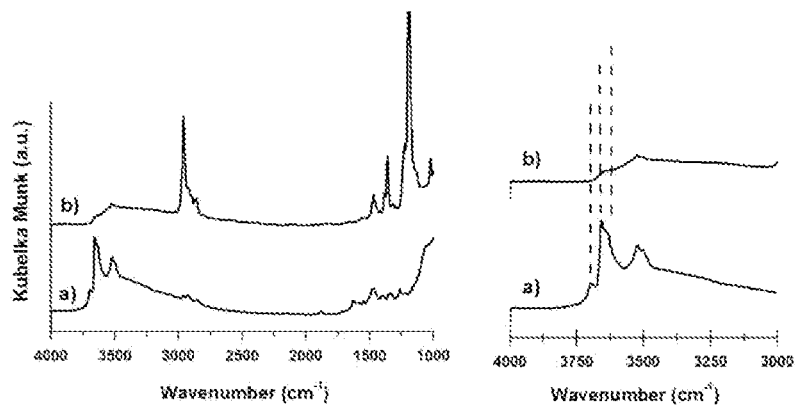
FIG. 14 shows DRIFT spectra of a) ceria dehydroxylated at 200° C. and b) the material after grafting of $[^tBuO_3WO]_2(\mu\text{-}O)$.

A mixture of $[^tBuO_3WO]_2(\mu\text{-}O)$ (600 mg, 0.70 mmol) and CeO$_2$ (1 g) in toluene (10 mL) was stirred at 25° C. for 4 h. After filtration, the solid $[^tBuO_3WO]_2(\mu\text{-}O)/CeO_{2\text{-}200}$ was washed three times with toluene. The resulting yellow powder was dried under vacuum (10$^{-5}$ Torr), as shown in FIG. 13;

Characterization of $[^tBuO_3WO]_2(\mu\text{-}O)/CeO_{2\text{-}200}$ by DRIFT

The resulted precatalyst was characterized and the DRIFT analysis showed bands between 3400 and 3700 cm$^{-1}$ attributed to different vibration mode of $v(CeO-H)$ completely disappeared. New bands in the 3100-2850 cm$^{-1}$ range and between 1620-1400 cm$^{-1}$ are observed, these peaks are characteristic of aliphatic $v(C-H)$ and $\delta(C-H)$ vibrations of the chemisorbed ligands on surface. These data confirmed the chemical reaction between surface hydroxyl groups of ceria with tungsten tert-butoxide precursor by protonolysis and formation of tert-butanol.

Figure 15:
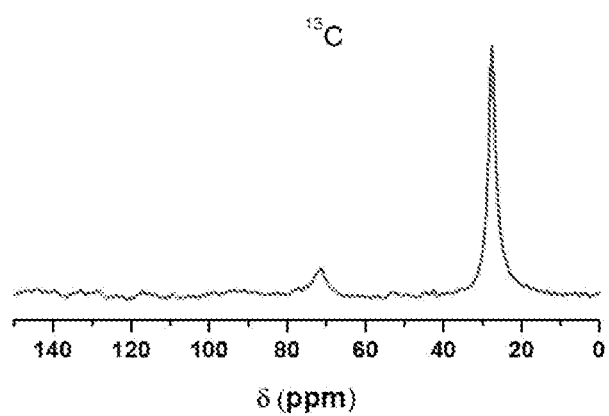
FIG. 15 shows $^{13}C$ CP MAS S NMR spectra of $[^tBuO_3WO]_2(\mu\text{-}O)/CeO_{2\text{-}200}$.

Characterization of $[^tBuO_3WO]_2(\mu\text{-}O)/CeO_{2\text{-}200}$ by Solid State NMR $^{13}C$ CP MAS NMR data show the presence of tungsten tert-butoxy fragments, as reflected by the $^{13}C$ peaks at 26 and 74 ppm, attributable to the methylene groups and quaternary carbon atoms respectively (FIG. 15).

Characterization of $[^tBuO_3WO]_2(\mu\text{-}O)/CeO_{2\text{-}200}$ by $N_2$ Physisorption The BET surface area analysis shows a moderate diminution of the surface to 147 m$^2$/g from the pristine material (240 m$^2$/g).

Step 3: Activation to Obtain Catalyst $(W_2O_x)_b/CeO_{2\text{-}200}$

Figure 16:
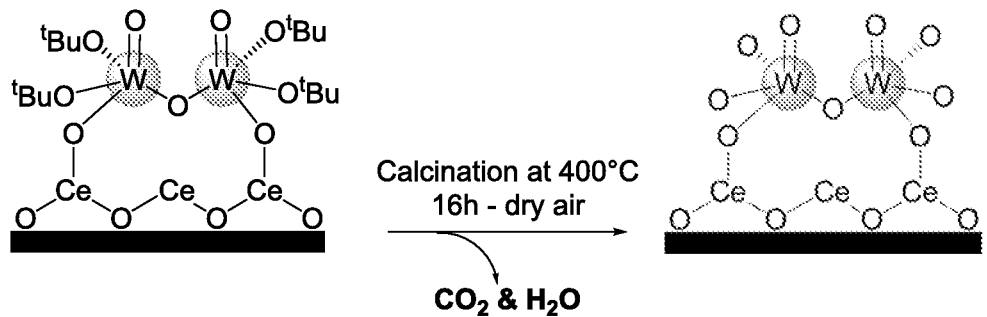
FIG. 16 shows a preparation of the catalyst $\{W_2O_x\}_b/CeO_{2\text{-}200}$ through calcination of the intermediate material $[(^tBuCH_2)_3W=O]_2(\mu\text{-}O)/CeO_{2\text{-}200}$. As observed for FIG. 9, the full details of the environment around the W atoms are not yet fully elucidated and the schematic diagram of the final product should be considered to be a non-binding current hypothesis.

The material $[(^tBuCH_2)_3W=O]_2(\mu\text{-}O)_b/CeO_{2\text{-}200}$ is then calcined using glass reactor under continuous flow of dry air at 500° C. for 16 h. The recovered material $(W_2O_x)_b/CeO_{2\text{-}200}$ prior to catalytic test was characterized. The calcination gives a yellowish powders referred to as $(W_2O_x)_b/CeO_{2\text{-}200}$ (FIG. 16).

Figure 17:
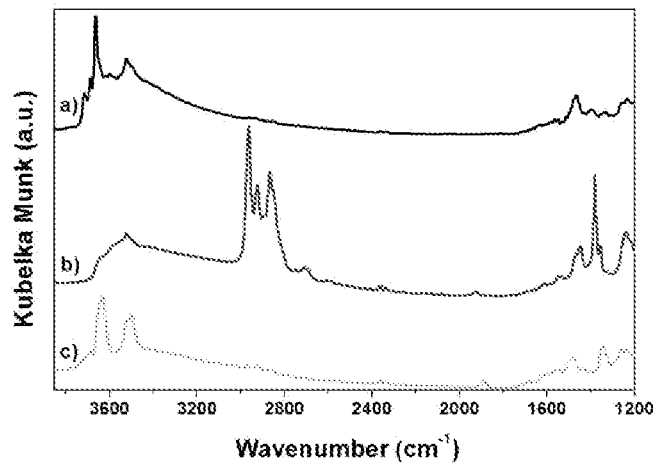
FIG. 17 shows DRIFT spectra of a) ceria dehydroxylated at 200° C., b) the intermediate material after grafting of $[^tBuO_3WO]_2(\mu\text{-}O)$, c) after the calcination of the intermediate pre-catalyst $(W_2O_x)_b/CeO_{2\text{-}200}$.

The infrared spectrum of FIG. 17 shows a disappearance of the $v(C-H)$ and $\delta(C-H)$ bands, indicating the total decomposition of the organic fragments. Moreover, new bands in the region of OH stretching vibration are observed between 3400 and 3700 cm$^{-1}$ attributable to $v(CeO-H)$ and at 3490 cm$^{-1}$ assignable to $v(W-O-H)$.

Figure 18:
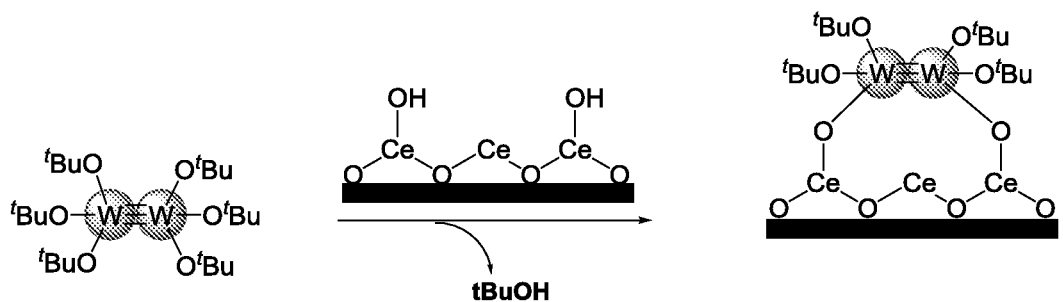
FIG. 18 shows a surface organometallic reaction of $(^tBuO)_3W\equiv W(^tBuO)_3$ with surface hydroxides of $CeO_2$ dehydroxylated at 200° C.
Figure 19:
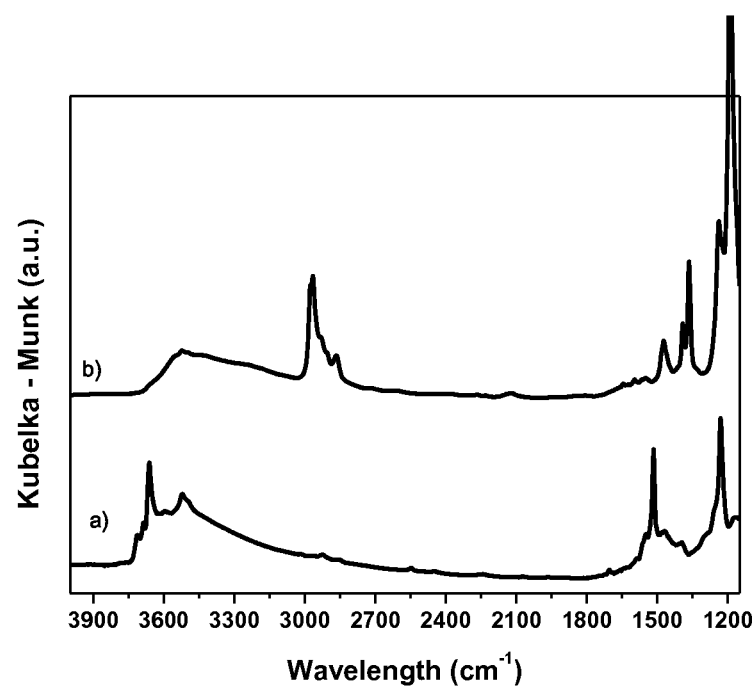
FIG. 19 shows DRIFT spectra of a) ceria dehydroxylated at 200° C. and b) the intermediate material after grafting of $(^tBuO)_3W\equiv W(^tBuO)_3$ on ceria dehydroxylated at 200° C.
Figure 20:
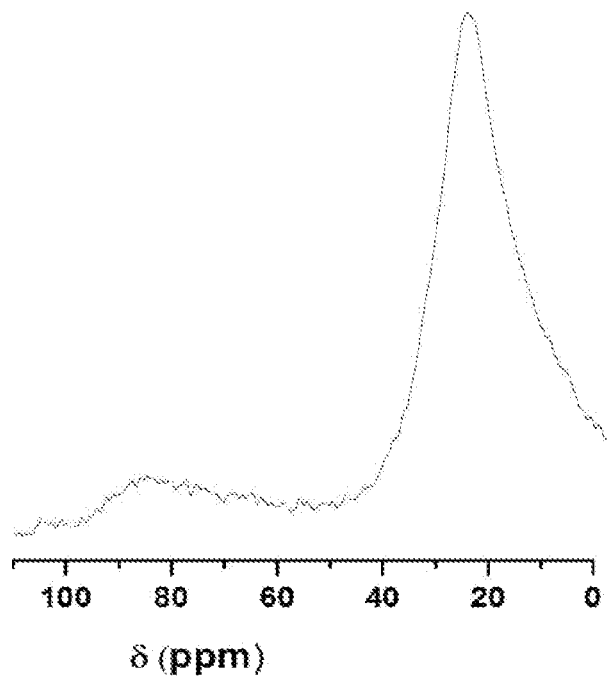
FIG. 20 shows a $^{13}C$ CPMAS S NMR spectrum of $(^tBuO)_3W\equiv W(^tBuO)_3/CeO_{2\text{-}200}$.
Figure 21:
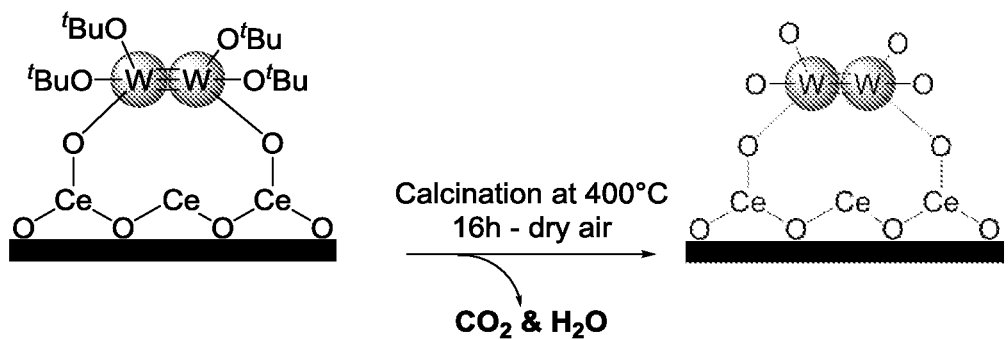
FIG. 21 shows a preparation of the catalyst $\{W_2O_x\}c/CeO_{2\text{-}200}$ through calcination of the intermediate $[(^tBuO)_3W\equiv W(^tBuO)_3/CeO_{2\text{-}200}$. As observed for FIG. 9, the full details of the environment around the W atoms are not yet fully elucidated and the schematic diagram of the final product should be considered to be a non-binding current hypothesis.
Figure 22:
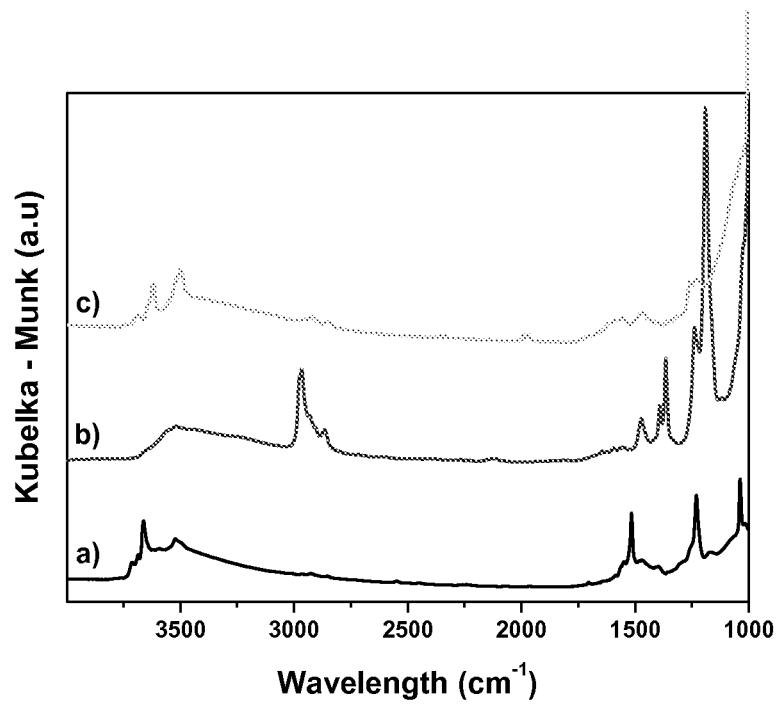
FIG. 22 shows DRIFT spectra of a) ceria dehydroxylated at 200° C., b) the intermediate material after grafting of [($^t$BuO)$_3$W≡W($^t$BuO)$_3$/CeO$_{2\text{-}200}$, c) after the calcination of the intermediate pre-catalyst.

Example 3 Preparation of Catalyst $W_2O_x/CeO_2$
From $(^tBuO)_3W\equiv W(^tBuO)_3/CeO_2$ Preparation of $CeO_2$
$CeO_2$ was prepared as in Example 1 above.
Synthesis of Precursor
Precursors were synthesized as set out in the above synthesis examples preceding Example 1.
Grafting
The grafting reaction of $(^tBuO)_3W\equiv W(^tBuO)_3$ on $CeO_{2\text{-}200}$ was performed in glove box. A mixture of a desired amount of $(^tBuO)_3W\equiv W(^tBuO)_3$ and $CeO_{2(200)}$ (3 g) in toluene (20 ml) was mixed at 25° C. for 4 h. After filtration, the solid $(^tBuO)_3W\equiv W(^tBuO)_3/CeO_2$ was washed three times with 10 ml of toluene and 10 ml of pentane. The resulting powder was dried under vacuum ($10^{-5}$ Torr) (FIG. 18).
Characterization $(^tBuO)_3W\equiv W(^tBuO)_3/CeO_{2\text{-}200}$ by DRIFT
The grafting reaction of $(^tBuO)_3W\equiv W(^tBuO)_3$ on xeria to form $(^tBuO)_3W\equiv W(^tBuO)_3/CeO_{2\text{-}200}$ is monitored by DRIFT spectroscopy. After the grafting reaction and the removal of the excess complex, the bands between 3400 and 3700 cm$^{-1}$ attributed to different vibration mode of $\nu$(CeO—H) at 3747 cm$^{-1}$ decreased in intensity. New bands in the 3100-2850 cm$^{-1}$ range and between 1620-1400 cm$^{-1}$ are observed, these peaks are characteristic of aliphatic $\nu$(C—H) and $\delta$(C—H) vibrations of the chemisorbed ligands on surface. These data confirm the chemical reaction between surface hydroxyl groups of ceria with tungsten precursor.
Characterization of $(^tBuO)_3W\equiv W(^tBuO)_3/CeO_{2\text{-}200}$ by Solid State NMR
$^{13}C$ CP MAS solid state NMR data show the presence of tungsten tert-butoxy fragments, as reflected by the $^{13}C$ peaks at 30 and 79 ppm, attributable to the methylene groups and quaternary carbon atoms respectively (FIG. 20).
Characterization of $(^tBuO)_3W\equiv W(^tBuO)_3/CeO_{2\text{-}200}$ by Elemental Analysis
Mass balance measurement carried out on this material of $(^tBuO)_3W\equiv W(^tBuO)_3/CeO_{2\text{-}200}$ showed the presence of 3.71 wt % 2.41 wt % of W and C respectively (C/W=10). This strongly suggests that the structure of the tungsten dimeric tert-butoxide fragments are bipodal dimeric species on the surface of the ceria.
Characterization of $(^tBuO)_3W\equiv W(^tBuO)_3/CeO_{2\text{-}200}$ by $N_2$ Physisorption
The BET surface area analysis shows a moderate diminution of the surface to 157 m$^2$/g from the pristine material (240 m$^2$/g), but still high enough, compared to the catalysts reported in the literature. In addition, an hysteresis loop can still observed, indicating the presence of the mesopores.
Activation to Obtain Catalyst $(W_2O_x)_c/CeO_{2\text{-}200}$
The material $[(^tBuO)_3W\equiv W(^tBuO)_3/CeO_{2\text{-}200}$ is calcined using glass reactor under continuous flow of dry air at 500° C. for 16 h. The recovered material $(W_2O_x)_c/CeO_{2\text{-}200}$ prior to catalytic test was characterized. The calcination gives a yellowish powders referred to as $(W_2O_x)_c/CeO_{2\text{-}200}$ The infrared spectrum of FIG. 22 shows a disappearance of the $\nu$(C—H) and $\delta$(C—H) bands, indicating the total decomposition of the organic fragments. Moreover, new bands in the region of OH stretching vibration are observed between 3400 and 3700 cm$^{-1}$ attributable to $\nu$(CeO—H) and at 3490 cm$^{-1}$ assignable to $\nu$(W—O—H).
Catalytic Activity Test Conditions
Pellet samples of approximate 33 mg were prepared under 1 ton pressure and put into a quartz reactor (diameter 4.5 mm). A mixture of gas consisting of NO 300 ppm, $NH_3$, 350 ppm, $O_2$ 10%, $H_2O$, 3%, $CO_2$ 10%, He (balance), was sent through a catalytic bed at the rate of 300 mL/min. The reactor was heated from room temperature to 600° C. with a heating rate of 10° C./min. The system was kept at 600° C. for 10 min before cooling down to room temperature. Gas composition at the outlet was monitored during the heating up and cooling down by a combination of FTIR, MS and chemiluminescence.

The invention claimed is:

1. A process for preparing a catalyst material, comprising the steps of:
   (a) providing a support material having surface hydroxyl (OH) groups, wherein the support material is ceria ($CeO_2$), zirconia ($ZrO_2$) or a combination of thereof;
   (b) reacting the support material having surface hydroxyl (OH) groups of step (a) with a precursor selected from the group consisting of $[(^tBuCH_2)_3W\!=\!O]_2(\mu\text{-}O)$; $[^tBuO_3W\!=\!O]_2(\mu\text{-}O)$; $(^tBuO)_3W\equiv W(^tBuO)_3$;
   (c) calcining the product obtained in step (b) in order to provide a catalyst material showing dual site surface species containing pairs of transition metal atoms derived from the precursor that are present in oxide form on the support material.

2. The process according to claim 1, wherein the support material is a ceria ($CeO_2$) or ceria-zirconia ($CeO_2$—$ZrO_2$) support.

3. The process according to claim 1, wherein the support material contains at least 0.3 mmol and at most 2.0 mmol OH groups/g of the support material.

4. The process according to claim 1, wherein the temperature in calcining step (c) is at least 300° C., the duration of the calcining step being least 1 hour.

5. The process according to claim 1, wherein the temperature in calcining step (c) is at most 700° C., and/or the duration of the calcining step is at most 30 hours.

6. The process according to claim 1, wherein the compound obtained in step (b) has at least 0.1 wt % and at most 5.0 wt %, of transition metal atoms derived from the precursor, in elemental analysis of the compound obtained in step (b).

7. The process according to claim 1, wherein the compound obtained after calcining step (c) has at least 0.1 wt % and at most 5.0 wt %, of transition metal atoms derived from the precursor, in elemental analysis of the compound obtained after calcining step (c).

* * * * *